United States Patent
Sancricca (10) Patent No.: US 9,827,936 B2
(45) Date of Patent: Nov. 28, 2017

(54) VEHICLE COLLISION ENERGY ABSORBANCE WITH MAGNETORHEOLOGICAL OR ELECTRORHEOLOGICAL MATERIAL

(71) Applicant: Robert Bosch GmbH, Stuttgart (DE)

(72) Inventor: Steven Sancricca, Grand Blanc, MI (US)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 15/041,133

(22) Filed: Feb. 11, 2016

(65) Prior Publication Data

US 2017/0232918 A1     Aug. 17, 2017

(51) Int. Cl.
*B60R 21/00* (2006.01)
*B60R 21/017* (2006.01)
(Continued)

(52) U.S. Cl.
CPC .......... *B60R 21/017* (2013.01); *B60R 19/023* (2013.01); *B60R 19/483* (2013.01);
(Continued)

(58) Field of Classification Search
CPC ... B60R 21/017; B60R 21/013; B60R 19/023; B60R 19/483; H01F 1/447; F16F 6/00; B60G 11/22
(Continued)

(56) References Cited

U.S. PATENT DOCUMENTS 7,930,150 B2 *   4/2011   Browne .............. G06F 17/5018
                                                              188/267.2
2005/0011710 A1   1/2005   Hitchcock et al.
(Continued)

FOREIGN PATENT DOCUMENTS

| DE | 10111199 | 9/2001 |
|---|---|---|
| WO | 2005061308 | 7/2005 |
| WO | 2014130178 | 8/2014 |

OTHER PUBLICATIONS

Sun et al., "An adaptive beam model and dynamic characteristics of magnetorheological materials" Journal of Sound and Vibration 261 (2003) 465-481.
(Continued)

*Primary Examiner* — Tan Q Nguyen
(74) *Attorney, Agent, or Firm* — Michael Best & Friedrich LLP (57) ABSTRACT

A method and vehicle control system for controlling stiffness of at least one support structure of a vehicle includes at least one of an acceleration sensor, a braking sensor and a corner sensor for providing a driving condition of the vehicle. A controller obtains information from the sensors to determine the driving condition and control the stiffness of a support structure of the vehicle. A magnetic field generator provides a magnetic field to control the stiffness of the support structure having a magnetorheological fluid or elastomer. An electrical source provides electrical current to a support structure including an electrorheological fluid or a support structure including a meta-material. When a vehicle collision is predicted no energy is provided to the support structure to minimize the stiffness and maximize energy absorbance by the support structure in a collision.

20 Claims, 4 Drawing Sheets

(51) Int. Cl.
  *B60R 21/013* (2006.01)
  *B60R 19/48* (2006.01)
  *B60R 19/02* (2006.01)
  *H01F 1/44* (2006.01)
  *F16F 6/00* (2006.01)
  *B60R 21/01* (2006.01)

(52) U.S. Cl.
  CPC ............ *B60R 21/013* (2013.01); *H01F 1/447* (2013.01); *B60R 2021/0004* (2013.01); *B60R 2021/01286* (2013.01); *B60R 2021/01311* (2013.01); *B60R 2021/01313* (2013.01)

(58) Field of Classification Search
  USPC .................... 701/45, 37, 38, 35; 280/124.177
  See application file for complete search history.

(56) References Cited

U.S. PATENT DOCUMENTS

| | | | |
|---|---|---|---|
| 2005/0087410 A1* | 4/2005 | Namuduri | F16F 9/535 188/267.2 |
| 2005/0234139 A1 | 10/2005 | Browne et al. | |
| 2006/0032715 A1* | 2/2006 | Barvosa-Carter | B61G 11/12 188/267 |
| 2006/0155469 A1* | 7/2006 | Kawasaki | B60R 21/013 701/301 |
| 2006/0192465 A1 | 8/2006 | Kornbluh et al. | |
| 2008/0015753 A1 | 1/2008 | Wereley et al. | |
| 2008/0290693 A1 | 11/2008 | Melz et al. | |
| 2009/0021048 A1 | 1/2009 | Melz et al. | |
| 2009/0283936 A1 | 11/2009 | Sanderson et al. | |
| 2011/0035118 A1* | 2/2011 | Hiemenz | B60N 2/4242 701/45 |
| 2013/0060428 A1* | 3/2013 | Battlogg | B60N 2/0276 701/45 |
| 2013/0087985 A1 | 4/2013 | Marur | |
| 2014/0203602 A1 | 7/2014 | Robbins et al. | |
| 2015/0034433 A1 | 2/2015 | Carlson et al. | |
| 2015/0100221 A1 | 4/2015 | Routledge et al. | |
| 2015/0258990 A1* | 9/2015 | Stettner | G01S 17/023 701/37 |

OTHER PUBLICATIONS

International Search Report and Written Opinion for Application No. PCT/EP2017/050388 dated May 2, 2017 (18 pages).

* cited by examiner

VEHICLE COLLISION ENERGY ABSORBANCE WITH MAGNETORHEOLOGICAL OR ELECTRORHEOLOGICAL MATERIAL

BACKGROUND

The present invention relates to a vehicle method and system for controlling stiffness of at least one support structure of a vehicle during acceleration, braking and cornering and absorbing energy in a vehicle collision.

Figure 1:
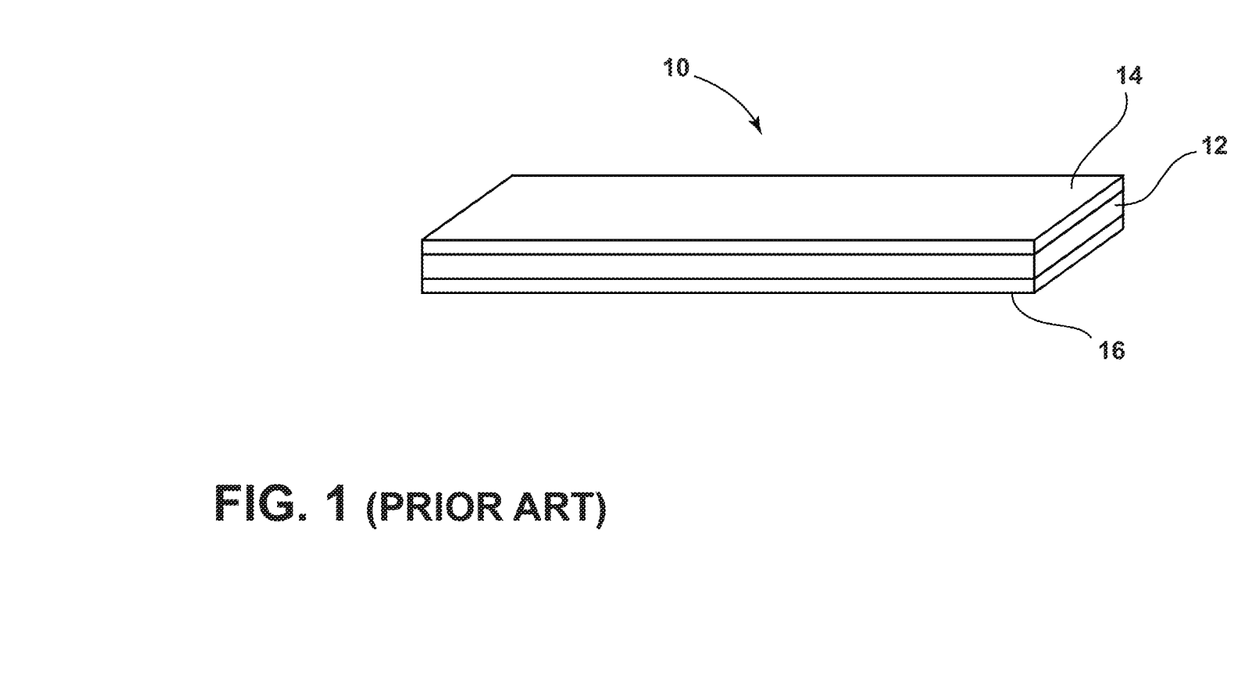
FIG. 1 is a schematic view of a prior art beam structure having a magnetorheological layer.

The dynamic behavior of flexible beams, plates and shells is important to the effective operation of many structures, such as automobiles, aircrafts and space platforms. With appropriate control, fatigue failure can be avoided and undesirable resonance can be eliminated. One known arrangement shown in prior art FIG. 1 is a beam structure 10 that includes a magnetorheological (MR) layer 12 surrounded by aluminum layers 14, 16. The MR layer 12 is sealed within and between the aluminum layers 14, 16. The aluminum layers 14, 16 can be considered a pair of plates and the MR layer 12 is a magnetorheological fluid in one known structure. This structure is set forth in "An adaptive beam model and dynamic characteristics of magnetorheological materials" Sun et al., Journal of Sound and Vibration 261 (2003) pp. 465-481. The MR layer 12 is in liquid form when there is no external stimuli. Applying a magnetic field to the beam or support structure 10 shown in FIG. 1 changes the MR layer to become more like a solid gel. Thus, the resonant frequency of the beam structure 10 that results in vibration of the beam structure can be changed by the magnetic field to avoid undesirable vibration that may result in noise. Further, fatigue failure for a beam structure 10 can be avoided by eliminating resonant vibration. In response to the magnetic field, the gel or MR layer 12 becomes more solid, resulting in an increased stiffness and decreased flexibility or pliability for the beam structure 10. Therefore, changing properties of the beam structure 10 occurs in response to the magnetic field.

Other structures are made from known magnetorheologic elastomers (MREs). These elastomers include one or more of soft magnetic particles, hard magnetic particles, magnetostrictive particles and magnetic shape-memory particles. Solid and porous matrix structures are known.

Known electrorheological (ER) materials or layers have also been embedded or otherwise disposed, for instance, in a laminated composite for controlling vibration thereof in a similar manner by applying electricity thereto. The electrorheological (ER) materials or the MR layer disposed in a composite, can be in the shape of beams, plates and shells.

Other known materials change properties in response to external stimuli. One known arrangement is a meta-material that includes a deformable structure coupled to a rigid element. Thus, at least two materials are required. In operation, when activated by electrostatic coupling, the meta-material increases in stiffness, damping or other mechanical properties. In one known structure, electrodes provide electrical current to increase stiffness. Other materials that change properties are provided in a group consisting of a piezo ceramic, a piezo polymer, an electrorestrictive ceramic, a polymer gel, a shape-memory alloy, and a shape-memory polymer. These known materials are disclosed in U.S. Pat. Pub. 2006/0192465.

SUMMARY

In one embodiment, the invention provides a vehicle control system for controlling a stiffness of at least one support structure of a vehicle, comprising at least one from a group consisting of an acceleration sensor, a braking sensor and a corner sensor for providing a driving condition of the vehicle. The vehicle control system includes a magnetic field generator, and at least one support structure of the vehicle, the at least one support structure changing properties in response to a magnetic field. An electronic controller is configured to obtain information from at least one from the group consisting of the acceleration sensor, the braking sensor and the corner sensor, determine the driving condition of the vehicle from the information, and in response to the driving condition, provide a control signal to at least the magnetic field generator to generate the magnetic field that is applied to the at least one support structure to control the stiffness of the at least one support structure.

In one embodiment, the support structure of the vehicle comprises a beam structure of a chassis and the controlling of the stiffness of the beam structure optimizes vehicle ride and handling characteristics.

In another embodiment, the support structure of the vehicle comprises a pair of plates having a magnetorheological fluid disposed between and sealed within to form a beam support structure.

In one embodiment, the system includes at least one from a group consisting of a vehicle camera, a collision sensor and a vehicle-to-vehicle communication link for providing collision information. The electronic controller is configured to obtain the collision information from at least one of the group consisting of the vehicle camera, the collision sensor and the vehicle-to-vehicle communication link, predict a collision for the vehicle from the collision information, and in response to the prediction of a collision, provide the control signal that reduces the stiffness of the at least one support structure before a collision occurs.

In one embodiment, in response to the prediction of a collision, the electronic controller provides the control signal so that the magnetic field generator provides no magnetic field, which minimizes the stiffness of the at least one support structure to maximize energy absorbance by the at least one support structure in event of a collision.

In another embodiment, the collision sensor includes a radar based collision sensor and the electronic controller is configured to predict a collision based on the collision information that includes images from the vehicle camera and closing data from the radar based collision sensor.

In another embodiment the invention provides a method for controlling a stiffness of at least one support structure of a vehicle during acceleration, braking and cornering, comprising: sensing at least one from a group consisting of acceleration, vehicle braking, and vehicle cornering of the vehicle, and determining a driving condition of the vehicle from the at least one of the acceleration, the vehicle braking and the vehicle cornering. In response to the driving condition, the method provides a control signal to a magnetic field generator, and generates a magnetic field with the magnetic field generator in response to the control signal that controls the stiffness of the at least one support structure One embodiment the invention provides a method for controlling a stiffness of at least one support structure of a vehicle during acceleration, braking and cornering, comprising sensing at least one from a group consisting of acceleration, vehicle braking, and vehicle cornering of the vehicle and determining a driving condition of the vehicle from the at least one of the acceleration, the vehicle braking and the vehicle cornering. In response to the driving condition, the method provides a control signal to an electrical source, and in response to the control signal, provides an electrical output from the electrical source to the at least one support structure to control the stiffness of the support structure to optimize vehicle ride and handling characteristics.

In one embodiment, the support structure of the vehicle includes a pair of plates having an electrorheological fluid disposed between and sealed within to form a beam support structure.

In another embodiment, the support structure of the vehicle includes a meta-material electrically connected to the electrical source.

One embodiment includes increasing the electrical output from the electrical source to the at least one support structure during aggressive acceleration of the vehicle to increase the stiffness of the support structure.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 2:
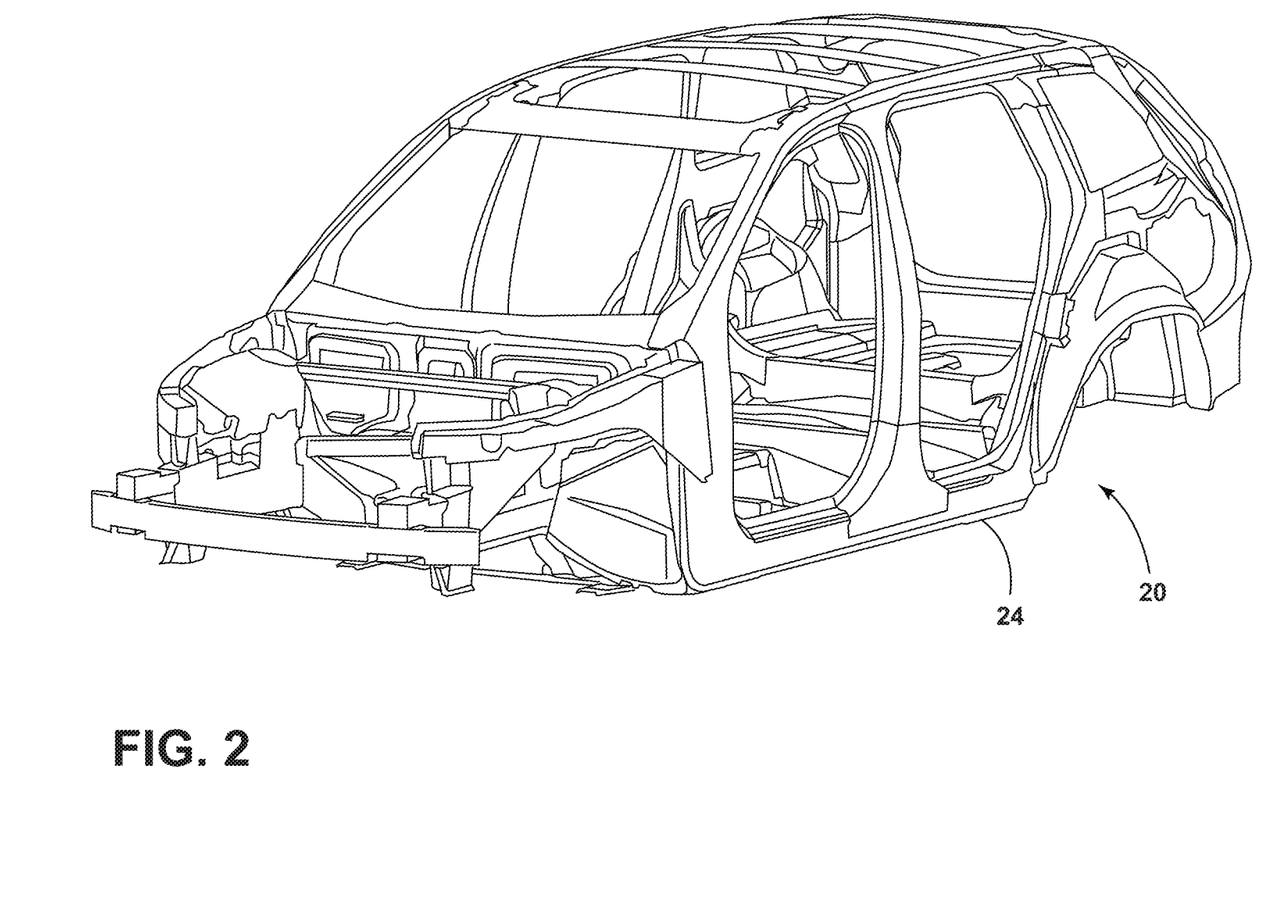
FIG. 2 is a perspective view of a chassis of a vehicle.

FIG. 2 shows a chassis 20 of a vehicle. The chassis 20 is usually made of aluminum, sheet metal, steel and other materials. and provided with appropriate cross beams and other support structures. A unibody chassis is a common type of structure used today in passenger vehicles. While the chassis 20 of FIG. 2 is known, the concept of utilizing beam structures, such as connection rail 24 that include a magnetorheological (MR) material or an electrorheological (ER) material is not common. In that respect, the chassis 20 shown in FIG. 2 differs from other chassis. For instance, one of a magnetic field applied to a MR layer and an electrical current applied to an ER layer of a connection rail 24 adjusts the stiffness thereof. The use of a metal material is also contemplated for the connection rail 24 and other elements of the chassis 20. Besides the connection rail 24, other beam and support structures shown in FIG. 2 that include a MR layer, ER layer, meta-material, or formed as or with a magnetorheological elastomer are contemplated.

Figure 3:
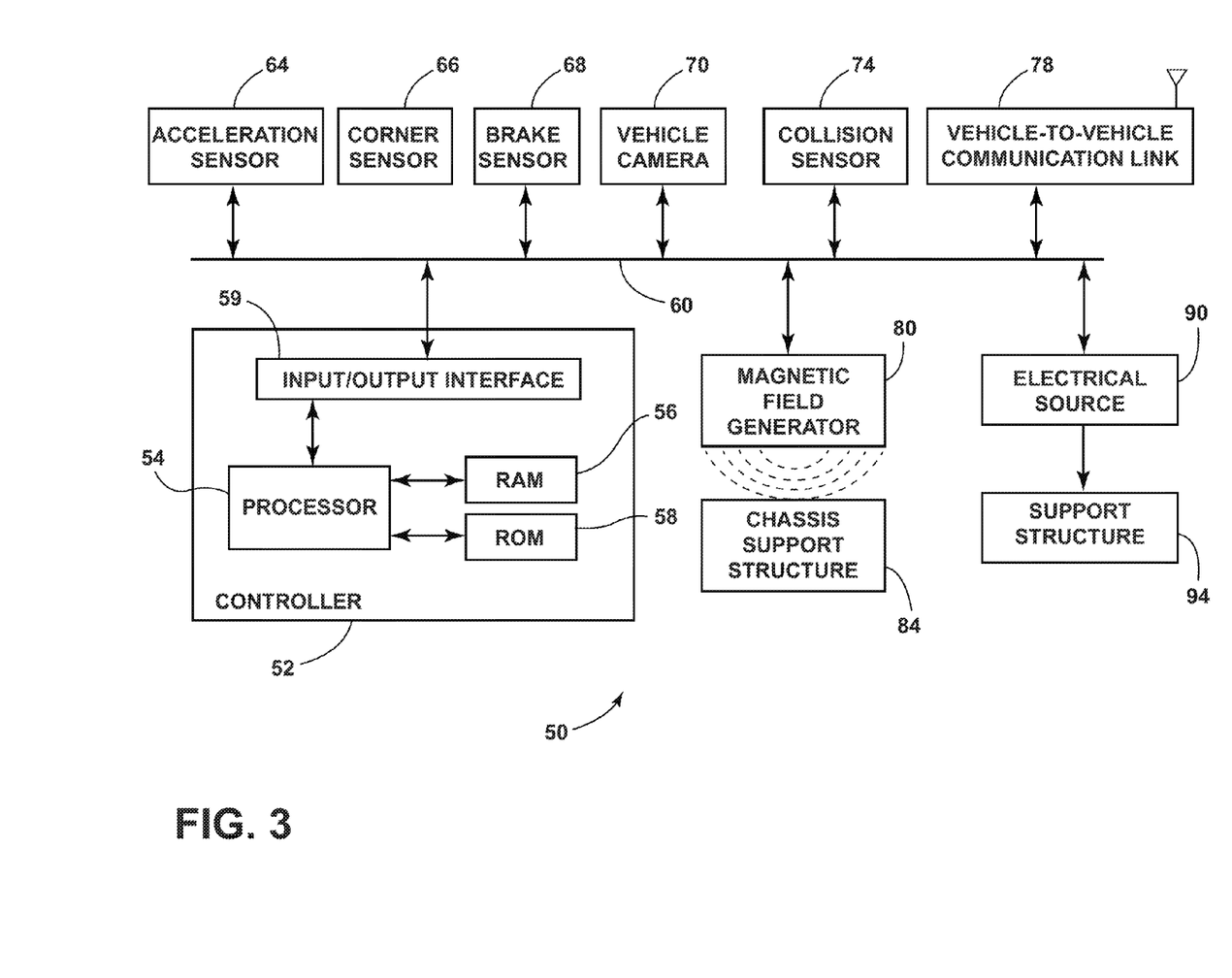
FIG. 3 is a block diagram of one embodiment of a vehicle control system.

FIG. 3 shows one embodiment of a vehicle control system 50 for controlling the stiffness of at least one support structure of a vehicle, such as a four-wheeled car or truck. The vehicle control system 50 includes an electronic controller 52. The electronic controller 52 obtains and analyzes information to control stiffness of a support structure.

The electronic controller 52 includes a processor 54 and one or more non-transitory, computer-readable memory modules. In FIG. 1, the electronic controller includes a random access memory module ("RAM") 56 and a read-only memory module ("ROM") 58. The electronic controller 52 also includes an input/output interface 59 that transmits and receives data over a network 60, for instance a controller area network ("CAN") bus or a Flex-ray bus. Other networks, such as a wireless network, are contemplated. It should be understood that the electronic controller 52 can include multiple processors, additional computer-readable memory modules, multiple I/O interfaces, and/or additional components or modules (e.g., hardware, software, or a combination thereof).

The processor 54 receives information from the I/O interface 59 and processes the information by executing instructions for one or more software modules (which may also be referred to as a "program") stored in a memory module of the electronic controller 52, such as the ROM 58. The processor 54 stores information to and retrieves information from the RAM 56 (e.g., information received from other vehicles, vehicle subsystems or sensors through the network 60 and information generated by modules executed by the processor 54). The non-transitory computer readable memory modules of the electronic controller 52 include volatile memory, non-volatile memory, or a combination thereof and, in various constructions, may also store operating system software, applications/instructions data, and combinations thereof. In another embodiment, an application specific integrated circuit (ASIC) performs the operations of the processor 54.

FIG. 3 shows a vehicle acceleration sensor 64 that provides a vehicle acceleration signal or output to the electronic controller 52 via the network 60. Likewise, a corner sensor 66 provides a vehicle cornering signal or output to the electronic controller 52 via the network 60. In some embodiments, an X-Y-Z acceleration sensor provides an acceleration/deceleration signal and the vehicle cornering signal (lateral acceleration) to the electronic controller 52. In another embodiment, a braking sensor 68 provides a braking signal to the electronic controller 52.

A vehicle camera 70 shown in FIG. 3 also communicates with the electronic controller 52 via the network 60 to provide video data and/or images thereto. The vehicle camera 70 is one or more cameras arranged for viewing in generally frontwardly oriented and/or rearwardly oriented directions for obtaining external video or images away from the vehicle that the vehicle cameras are mounted to.

A collision sensor 74 shown in FIG. 3 also communicates with the electronic controller 52 via the network 60 to provide collision information signals thereto. The collision sensor 74 includes one or more collision sensors mounted to the vehicle and arranged for viewing in generally frontwardly oriented and rearwardly oriented directions away from the vehicle. In one embodiment, the collision sensor 74 is a radar based collision sensor for detecting the presence and closing data, such as closing speed, of approaching vehicles or other detected objects. In another embodiment, the collision sensor 74 is a Lidar collision sensor for detecting another vehicle nearby. Other types of collision sensors, including ultrasonic and infrared sensors, are contemplated.

In some embodiments, a vehicle-to-vehicle communication link 78 also communicates with the electronic controller 52 via the network 60. The vehicle-to-vehicle communication link 78 includes a transceiver and an antenna to broadcast and receive vehicle information or vehicle data from another vehicle nearby. In one embodiment, the transceiver includes a radio frequency (RF) transmitter and a radio frequency (RF) receiver. Other transmission links are contemplated. In one embodiment, the vehicle collision information includes vehicle speed, acceleration and other properties of the approaching vehicle. The electronic controller 52 of the host or subject vehicle uses the collision information received from another nearby approaching vehicle to assist in determining the likelihood of a collision.

A magnetic field generator 80 shown in FIG. 3 is disposed within the vehicle. The magnetic field generator 80 is in operative communication with the electronic controller 52 via the network 60. The magnetic field generator 80 is disposed adjacent to or near to one or more support structures 84. The support structure 84 is a beam, plate or shell structure or other chassis support structure. Other support structures 84 related to the structural integrity of a vehicle are contemplated. In some embodiments, a plurality of magnetic field generators 80 are disposed at plural locations throughout the vehicle and generate magnetic fields for respective ones of a plurality of support structures 84 of the chassis 20 of a vehicle. In one embodiment, the support structure 84 includes a pair of plates having a magnetorheological fluid disposed between as an MR layer. The MR layer is affected by the magnetic field to increase the stiffness or rigidity thereof, which increases the stiffness of the support structure 84. In another embodiment, the support structure is formed with or as a magnetorheological elastomer, instead of a magnetorheological fluid.

Another embodiment that is also illustrated in FIG. 3 includes an electrical source 90 disposed within the vehicle. The electrical source 90 is in operative communication with the electronic controller 52 via the network 60. The electrical source 90 is in electrical communication with at least one support structure 94, such as a chassis support structure including a beam or other element. The electrical source 90 provides electrical current directly to the support structure 94 to increase the stiffness or rigidity thereof. In one embodiment, the support structure 94 is an electrorheological fluid. In another embodiment, the support structure 94 is a meta-material. In either instance, the applied electrical current increases the stiffness of the support structure 94.

Operation

Figure 4:
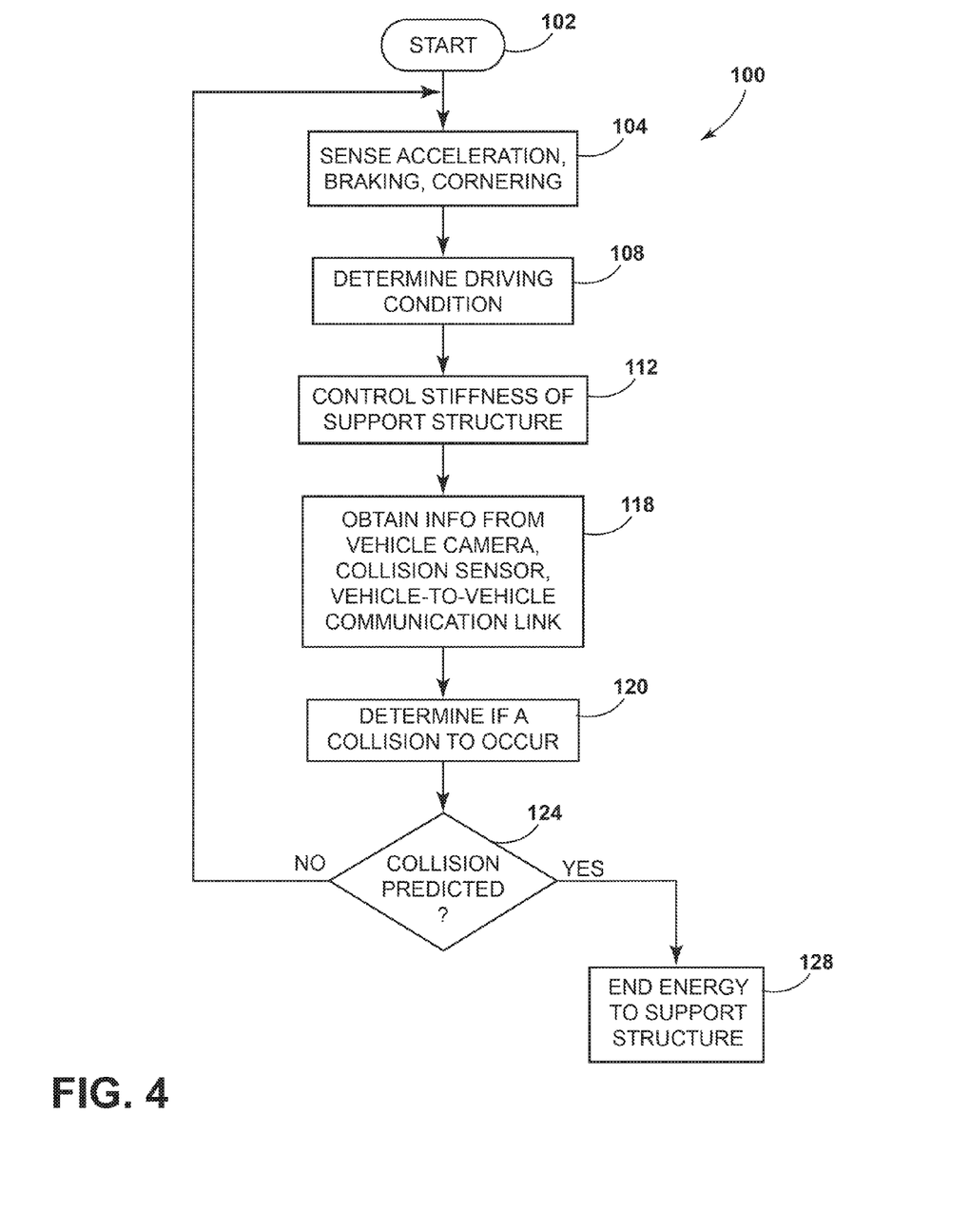
FIG. 4 is a flow chart showing the operation of one embodiment of a vehicle control system.

FIG. 4 is a flowchart 100 illustrating one method in which the vehicle control system 50 monitors driving conditions and controls the stiffness of a support structure 84, 94. The steps shown in FIG. 4 are for purposes of illustration, and thus the order of the steps can be changed in many instances while having no effect on execution of a program by the electronic controller 52. In one embodiment, the processor 54 of the electronic controller 52 is configured to execute the steps shown in FIG. 4, along with additional steps for other purposes.

The electronic controller 52 obtains at least one of a vehicle acceleration signal from the vehicle acceleration sensor 64, a cornering signal from the corner sensor 66 and a brake signal from the braking sensor 68 (step 104). The electronic controller 52 also obtains a vertical acceleration in one embodiment.

The processor 54 of the electronic controller 52 then determines a driving condition of the vehicle. If the vehicle is accelerating rapidly, the processor 54 determines that increasing the stiffness of chassis support structures 84, 94 of the vehicle will increase vehicle stability, improve handling and increase comfort for an operator (step 108). The determination can be made from one or more of the above sensed conditions. In one embodiment, an X-Y-Z acceleration sensor provides the acceleration/deceleration signal and the vehicle cornering signal (lateral acceleration) to the electronic controller 52. The processor 54 does not require a vehicle brake signal to determine the driving condition of the vehicle.

Depending on the driving condition, the processor 54 provides a control signal via network 60 to a magnetic field generator 80 or an electrical source 90. While both devices for applying energy are shown in FIG. 3, most embodiments will have only one of the magnetic field generator 80 or the electrical source 90 to apply energy to a chassis support structure 84, 94. Providing the energy acts to controls the stiffness of the chassis support structure (step 112). In the instance of generating a magnetic field with the magnetic field generator 80, the chassis support structure 84 includes a material that has stiffness affected by the magnetic field, such as a beam structure 10 formed with a magnetorheological (MR) layer 12 enclosed or sealed within a sheet metal structure or other material. Increasing the magnetic field applied to the MR layer 12 increases the stiffness of the corresponding beam structure. In an embodiment having a beam structure with an electrorheological (ER) layer, the processor 54 provides a control signal to the electrical source 90 that applies electricity directly to the beam structure having an ER layer. Again, increasing the electrical current applied to the ER layer increases the stiffness of the ER layer and the corresponding beam structure. In another embodiment, a support structure 94 including a meta-material is electrically connected to the electrical source 90. The electrical source 90 provides electrical current to the meta-material formed as a support structure, wherein one component or material of the meta-material changes to provide increasing stiffness for a corresponding beam support structure in response to increasing current output applied thereto.

Thereafter, as shown in FIG. 4, the processor 54 receives collision data or obtains collision information from one or more from the group consisting of a vehicle camera 70, collision sensor 74, and vehicle-to-vehicle communication link 78 (step 116).

The processor 54 operates to determine or predict the likelihood of a potential vehicle collision from video data or images from the vehicle camera 70 and/or from collision signals from the collision sensor 74 (step 120). Further, vehicle speed and directional information from nearby vehicles are obtained via the vehicle-to-vehicle communication link 78. In some instances, the nearby vehicles are not viewable by the operator vehicle while communicating information thereto. For instance, the nearby vehicle and the operator vehicle can be traveling toward an intersection on different roadways. In one embodiment, the data or collision information from any one or more of the vehicle camera 70, the collision sensor 74, and the vehicle-to-vehicle communication link 78 is capable of predicting a potential collision.

The processor 54 then decides whether to continue executing the program or to prepare for a collision (decision step 124). When no collision is likely, the processor 54 returns to step 104 and the flowchart 100 repeats steps 104, 108, 112, 116, 120. Thus, the stiffness of the support structure 84, 94 is adjusted again in view of sensed acceleration, braking and/or cornering.

When the processor 54 determines the prediction of a collision has occurred (decision step 124), the processor stops or ends the application of energy to the support structure 84, 94 (step 128). Ending the application of a magnetic field to the chassis support structure 84 or the application of electrical current to the support structure 94, reduces or minimizes stiffness of the underlying structures. Therefore, in the event of a crash, the support structure 84, 94 collapses and absorbs energy, thus minimizing the amount of force applied to an operator and passengers in the vehicle.

Variations of the embodiments of the invention are contemplated. In one embodiment, the acceleration sensor determines a rough or bumpy road and the vehicle control system 50 adjusts the stiffness of support structures that include connection rails 24 to improve the ride of the vehicle.

In another embodiment, the electrical source 90 increases the electrical output or electrical current to the support structure 94 during aggressive acceleration of the vehicle to increase stiffness of the support structure.

In one embodiment, when a vehicle is cornering and lateral force is significant, stiffness of a support structure on one side of the vehicle is increased.

In one embodiment, a plurality of magnetic field generators are provided for multiple support structures. In another embodiment, separate electrical connections are provided between the electrical source 90 and multiple support structures 94. Thus, the electronic controller 52 can selectively control the stiffness of desired selected support structures 94.

While individual sensors and the like are shown in FIG. 3, in some embodiments, the acceleration sensor and the cornering sensor are provided with a single sensing device. Such a sensing device includes an accelerometer that senses lateral and longitudinal acceleration, or acceleration along a x-axis, y-axis and z-axis, respectively. Further, in one embodiment, an electronic stability control outputs the acceleration and cornering sensor values to the electronic controller 52. In another embodiment, an electronic stability control performs and operates as the electronic controller 52 shown in FIG. 3.

By providing major support structures of the vehicle, such as the connection rail 24 shown in FIG. 2 with reduced stiffness, the major support structures collapse in a collision to absorb additional energy and decrease the force of the collision that is transmitted to persons located in a vehicle interior.

Thus, the invention provides, among other things, a method and vehicle control system for controlling stiffness of chassis support structures of a vehicle to optimize vehicle ride and handling. Further, the vehicle control system predicts a vehicle collision to minimize the stiffness of the support structure and to maximize vehicle collision energy absorbance by the support structure. Various features and advantages of the invention are set forth in the following claims.

What is claimed is:

1. A vehicle control system for controlling a stiffness of at least one support structure of a vehicle, comprising:
   at least one from a group consisting of an acceleration sensor, a braking sensor and a corner sensor for providing a driving condition of the vehicle,
   a magnetic field generator,
   the at least one support structure changing properties in response to a magnetic field,
   an electronic controller configured to:
      obtain information from at least one from the group consisting of the acceleration sensor, the braking sensor and the corner sensor,
      determine the driving condition of the vehicle from the information, and
      in response to the driving condition, provide a control signal to at least the magnetic field generator to generate the magnetic field that is applied to the at least one support structure to control the stiffness of the at least one support structure,
   wherein the at least one support structure of the vehicle comprises a beam structure of a chassis.

2. The system according to claim 1, wherein the controlling of the stiffness of the beam structure optimizes vehicle ride and handling characteristics.

3. The system according to claim 1, wherein the beam structure of the vehicle comprises a pair of plates having a magnetorheological fluid disposed between and sealed within to form the beam structure.

4. The system according to claim 1, further comprising:
   at least one from a group consisting of a vehicle camera, a collision sensor and a vehicle-to-vehicle communication link for providing collision information,
   wherein the electronic controller is configured to
      obtain the collision information from at least one of the group consisting of the vehicle camera, the collision sensor and the vehicle-to-vehicle communication link,
      predict a collision for the vehicle from the collision information, and
      in response to the prediction of a collision, provide the control signal that reduces the stiffness of the beam structure before a collision occurs.

5. The system according to claim 4, wherein in response to the prediction of a collision, the electronic controller provides the control signal so that the magnetic field generator provides no magnetic field, which minimizes the stiffness of the beam structure to maximize energy absorbance by the beam structure in event of a collision.

6. The system according to claim 4, wherein the collision sensor includes a radar based collision sensor and the electronic controller is configured to predict a collision based on the collision information that includes images from the vehicle camera and closing data for a nearby vehicle from the radar based collision sensor.

7. A method for controlling a stiffness of at least one support structure of a vehicle during acceleration, braking and cornering, comprising:
   sensing at least one from a group consisting of acceleration, vehicle braking, and vehicle cornering of the vehicle,
   determining a driving condition of the vehicle from the at least one of the acceleration, the vehicle braking and the vehicle cornering,
   in response to the driving condition, providing a control signal to a magnetic field generator, and
   generating a magnetic field with the magnetic field generator in response to the control signal that controls the stiffness of the at least one support structure, wherein the at least one support structure comprises a beam structure of a chassis.

8. The method according to claim 7, wherein the controlling of the stiffness of the beam structure optimizes vehicle ride and handling characteristics.

9. The method according to claim 7, wherein the beam structure of the vehicle comprises a pair of plates having a magnetorheological fluid disposed between and sealed within to form a beam support structure.

10. The method according to claim 7, including obtaining collision information from at least one from the group consisting of a vehicle camera, a collision sensor and a vehicle-to-vehicle communication link,
    predicting a collision for the vehicle based on the collision information, and
    in response to the prediction of a collision, providing the control signal that reduces the stiffness of the beam structure before a collision occurs.

11. The method according to claim 10, wherein in response to the prediction of a collision, generating no magnetic field with the magnetic field generator to minimize the stiffness of the beam structure of the chassis and maximize energy absorbance by the beam structure in event of a collision.

12. The method according to claim 10, wherein the collision sensor includes a radar based collision sensor and the predicting of a collision is based on the collision information that includes images from the vehicle camera and closing data for a nearby vehicle approaching the vehicle detected by the radar based collision sensor.

13. The method according to claim 7, wherein the beam structure of the chassis comprises a magnetorheological elastomer.

14. A method for controlling a stiffness of at least one support structure of a vehicle during acceleration, braking and cornering, comprising:
    sensing at least one from a group consisting of acceleration, vehicle braking, and vehicle cornering of the vehicle,
    determining a driving condition of the vehicle from the at least one of the acceleration, the vehicle braking and the vehicle cornering,
    in response to the driving condition, providing a control signal to an electrical source, and
    in response to the control signal, providing an electrical output from the electrical source to the at least one support structure to control the stiffness of the support structure to optimize vehicle ride and handling characteristics.

15. The method according to claim 14, wherein the at least one support structure of the vehicle includes a pair of plates having an electrorheological fluid disposed between and sealed within to form a beam support structure.

16. The method according to claim 14, wherein the at least one support structure of the vehicle includes a meta-material electrically connected to the electrical source.

17. The method according to claim 14, including increasing the electrical output from the electrical source to the at least one support structure during aggressive acceleration of the vehicle to increase the stiffness of the support structure.

18. The method according to claim 14, including
    obtaining collision information from at least one from the group consisting of a vehicle camera, a radar based collision sensor and a vehicle-to-vehicle communication link,
    predicting a collision for the vehicle based on the collision information, and
    in response to the prediction of a collision, providing the control signal that reduces the stiffness of the at least one support structure before a collision occurs.

19. The method according to claim 18, wherein in response to the prediction of a collision, providing no electrical output from the electrical source to the at least one support structure to minimize the stiffness of the support structure and maximize energy absorbance by the support structure in event of a collision.

20. The method according to claim 18, wherein the collision sensor includes a radar based collision sensor and the predicting of a collision is based on the collision information that includes images from the vehicle camera and closing data for another vehicle approaching the vehicle detected by the radar based collision sensor.

* * * * *